(12) United States Patent
Lukac

(10) Patent No.: US 8,078,007 B2
(45) Date of Patent: Dec. 13, 2011

(54) ENLARGING A DIGITAL IMAGE

(75) Inventor: Rastislav Lukac, Toronto (CA)

(73) Assignee: Seiko Epson Corporation, Tokyo (JP)

( * ) Notice: Subject to any disclaimer, the term of this patent is extended or adjusted under 35 U.S.C. 154(b) by 1010 days.

(21) Appl. No.: 11/970,580

(22) Filed: Jan. 8, 2008

(65) Prior Publication Data

US 2009/0175560 A1 Jul. 9, 2009

(51) Int. Cl.
*G06K 9/32* (2006.01)
*G09G 5/02* (2006.01)

(52) U.S. Cl. ......................... 382/299; 345/698

(58) Field of Classification Search .......... 382/298–300, 382/274, 267, 264, 237, 266, 269; 345/426, 345/603, 698; 347/251, 224, 43, 1; 358/3.23, 358/502, 534, 536, 1.2, 3.27, 3.26, 3.15
See application file for complete search history.

(56) References Cited

U.S. PATENT DOCUMENTS

| | | | |
|---|---|---|---|
| 4,437,122 A | 3/1984 | Walsh et al. | |
| 4,945,502 A | 7/1990 | Kwon et al. | |
| 5,054,100 A * | 10/1991 | Tai | 382/300 |
| 5,384,904 A * | 1/1995 | Sprague et al. | 345/668 |
| 5,627,953 A | 5/1997 | Yen | |
| 5,657,047 A | 8/1997 | Tarolli | |
| 5,712,687 A | 1/1998 | Naveen et al. | |
| 5,742,300 A | 4/1998 | Klassen | |
| 5,799,111 A | 8/1998 | Guissin | |
| 5,889,895 A * | 3/1999 | Wong et al. | 382/300 |
| 6,021,256 A | 2/2000 | Ng et al. | |
| 6,133,960 A | 10/2000 | Mendenhall | |
| 6,256,654 B1 | 7/2001 | Mou | |
| 6,289,133 B1 * | 9/2001 | Oshino | 382/261 |
| 6,297,801 B1 | 10/2001 | Jiang | |
| 6,307,569 B1 | 10/2001 | Ratakonda | |
| 6,331,902 B1 | 12/2001 | Lin | |
| 6,377,280 B1 | 4/2002 | Acharya et al. | |
| 6,400,849 B1 * | 6/2002 | Lee et al. | 382/260 |
| 6,522,425 B2 | 2/2003 | Yoshidome | |
| 6,577,778 B1 * | 6/2003 | Wu et al. | 382/300 |

(Continued)

FOREIGN PATENT DOCUMENTS

EP 0196046 A2 10/1986

(Continued)

OTHER PUBLICATIONS

Edge Detection Techniques—An Overview, Djemel Ziou, Salvatore Tabbone, International Journal of Pattern Recognition and Image Analysis, 8(4), Jan. 1988, (pp. 1-41).

(Continued)

*Primary Examiner* — Gregory M Desire
*Assistant Examiner* — Andrae S Allison
(74) *Attorney, Agent, or Firm* — Mark P. Watson

(57) ABSTRACT

Enlarging a digital image. In one example embodiment, a method for enlarging a digital image includes various acts. First, an enlargement factor $\lambda$ is selected for an input image. Next, a pixel in the input image is selected. Then, a supporting window is placed over the input image. Next, a $\lambda \times \lambda$ block of output pixels is produced. Each pixel in the block of output pixels is produced using a set of $\lambda^2$ distinct weight matrices. Then, the block of output pixels is assembled into an output image. Next, the acts of selecting a pixel, placing the supporting window, producing a block of output pixels, and assembling the block of output pixels into the output image are repeated for each of the remaining pixels in the input image.

24 Claims, 2 Drawing Sheets

U.S. PATENT DOCUMENTS

| | | | |
|---|---|---|---|
| 6,650,793 B1 | 11/2003 | Lund et al. | |
| 6,694,059 B1 | 2/2004 | Zlotnick | |
| 6,704,463 B1 | 3/2004 | Okada et al. | |
| 6,714,688 B1 * | 3/2004 | Gallagher et al. | 382/266 |
| 6,714,692 B1 * | 3/2004 | Kim et al. | 382/299 |
| 6,771,835 B2 * | 8/2004 | Han et al. | 382/260 |
| 6,812,935 B1 | 11/2004 | Joe et al. | |
| 6,873,358 B1 | 3/2005 | Shimizu | |
| 6,876,778 B2 | 4/2005 | Lin et al. | |
| 6,898,319 B1 | 5/2005 | Hazra et al. | |
| 7,129,920 B2 | 10/2006 | Chow | |
| 7,199,897 B2 | 4/2007 | Nomizu | |
| 7,609,912 B2 * | 10/2009 | Chae | 382/300 |
| 7,869,665 B2 * | 1/2011 | Chen et al. | 382/300 |
| 2002/0140854 A1 | 10/2002 | Lan | |
| 2002/0154115 A1 | 10/2002 | Borac | |
| 2003/0189579 A1 | 10/2003 | Pope | |
| 2004/0017492 A1 | 1/2004 | Stavely | |
| 2005/0058362 A1 | 3/2005 | Kita | |
| 2005/0213851 A1 * | 9/2005 | Lin | 382/298 |
| 2006/0033936 A1 | 2/2006 | Lee et al. | |

FOREIGN PATENT DOCUMENTS

| | | |
|---|---|---|
| JP | 04016061 | 1/1992 |
| JP | 06054232 | 2/1994 |
| JP | 2001292311 | 10/2001 |
| JP | 2004072263 | 3/2004 |
| JP | 2006074782 | 3/2006 |
| JP | 2006323045 | 11/2006 |
| WO | 2006000970 A1 | 1/2006 |

OTHER PUBLICATIONS

An Effective Edge-Directed Frequency Filter for Removal of Aliasing in Upsampled Images, Artur Rataj, Institute of Theoretical and Applied Computer Science, arXiv:cs.CV/0609010 V1, Sep. 4, 2006, (pp. 1-15).

Synthetic Texturing Using Digital Filters, Eliot A. Feibush, Marc Levoy and Robert L. Cook, Program of Computer Graphics, 1980 ACM 0-89791-021-4/80/0700-0294, (pp. 294-301).

* cited by examiner

ENLARGING A DIGITAL IMAGE

THE FIELD OF THE INVENTION

The invention relates to digital image processing. More specifically, embodiments of the present invention relate to methods for enlarging a digital image.

BACKGROUND

A digital image is a representation of a two-dimensional analog image as a finite set of pixels. Digital images can be created by a variety of devices, such as digital cameras, scanners, and various other computing and imaging devices. Digital image processing is the use of computer algorithms to perform image processing on digital images. Image processing operations include, for example, color to gray-scale conversion, color adjustment, intensity adjustment, scene analysis, object recognition, and resolution adjustment.

Resolution adjustment is typically accomplished using a spatial interpolation method. Spatial interpolation refers to the process of changing the spatial resolution of a digital image. Spatial interpolation can either result in the compression of a digital image by removing pixels from the digital image, or in the enlargement of a digital image by adding pixels to the digital image. Digital images can be compressed in order to reduce the memory required to store and/or transmit a digital image, for example. Digital images can be enlarged in order to overcome the limitations in optical capabilities of a digital camera by increasing the number of pixels representing a visual scene, for example.

Conventional methods for enlarging a digital image include bilinear and bicubic interpolation. However, both of these approaches present problems. For example, when bilinear interpolation is used to enlarge a digital image, the process can result in a relatively low quality image. Alternatively, the use of a bicubic interpolation process, which may result in a higher quality image, can be relatively computationally inefficient and therefore costly in terms of time and processing resources. Thus, it would be an advancement in the art to provide an improved image processing technique for enlarging digital images having high image quality and that does so in a manner that is computationally efficient.

SUMMARY OF EXAMPLE EMBODIMENTS

In general, example embodiments relate to methods for enlarging a digital image. Example embodiments can be used to produce relatively high quality enlarged digital images in a relatively computationally efficient manner. Example embodiments therefore produce enlarged digital images relatively inexpensively in terms of time and processing resources.

In a first example embodiment, a method for enlarging a digital image includes various acts. First, an enlargement factor $\lambda$ is selected for an input image. Next, a pixel in the input image is selected. Then, a $(\lambda+\gamma) \times (\lambda+\gamma)$ supporting window is placed over the input image. The supporting window is substantially centered in the selected pixel. Next, a $\lambda \times \lambda$ block of output pixels is produced. Each pixel in the block of output pixels is produced by summing the results of multiplying the pixels located inside the supporting window by one of a set of $\lambda^2$ distinct $(\lambda+\gamma) \times (\lambda+\gamma)$ weight matrices. Then, the block of output pixels is assembled into an output image. Next, the acts of selecting a pixel, placing the supporting window, producing a block of output pixels, and assembling the block of output pixels into the output image are repeated for each of the remaining pixels in the input image.

In a second example embodiment, one or more computer-readable media having computer-readable instructions thereon which, when executed, implement the method for enlarging a digital image discussed above in connection with the first example embodiment.

In a third example embodiment, an image processing device includes a processor and one or more computer-readable media having computer-readable instructions thereon which, when executed by the processor, implement the method for enlarging a digital image discussed above in connection with the first example embodiment.

The foregoing embodiments provide a number of advantages when compared to conventional techniques. For example, the methodologies utilized result in an enlarged output image having good quality—higher, for example, than that which can be typically achieved when utilizing conventional bilinear interpolation techniques. Moreover, example embodiments can be implemented via algorithms that are very computationally efficient when compared, for example, with techniques utilizing bicubic interpolation. In this way, embodiments of the present invention can be implemented in a manner that lowers the overall cost of the imaging device, while still providing for a device that provides excellent image quality.

BRIEF DESCRIPTION OF THE DRAWINGS

To further develop the above and other aspects of example embodiments of the invention, a more particular description of these examples will be rendered by reference to specific embodiments thereof which are disclosed in the appended drawings. It is appreciated that these drawings depict only example embodiments of the invention and are therefore not to be considered limiting of its scope. It is also appreciated that the drawings are diagrammatic and schematic representations of example embodiments of the invention, and are not limiting of the invention. Example embodiments of the invention will be disclosed and explained with additional specificity and detail through the use of the accompanying drawings in which.

DETAILED DESCRIPTION OF EXAMPLE EMBODIMENTS

In general, example embodiments relate to methods for enlarging a digital image. Example embodiments can be used to produce relatively high quality enlarged digital images in a relatively computationally efficient manner. Example embodiments therefore produce enlarged digital images relatively inexpensively in terms of time and processing resources.

Figure 1:
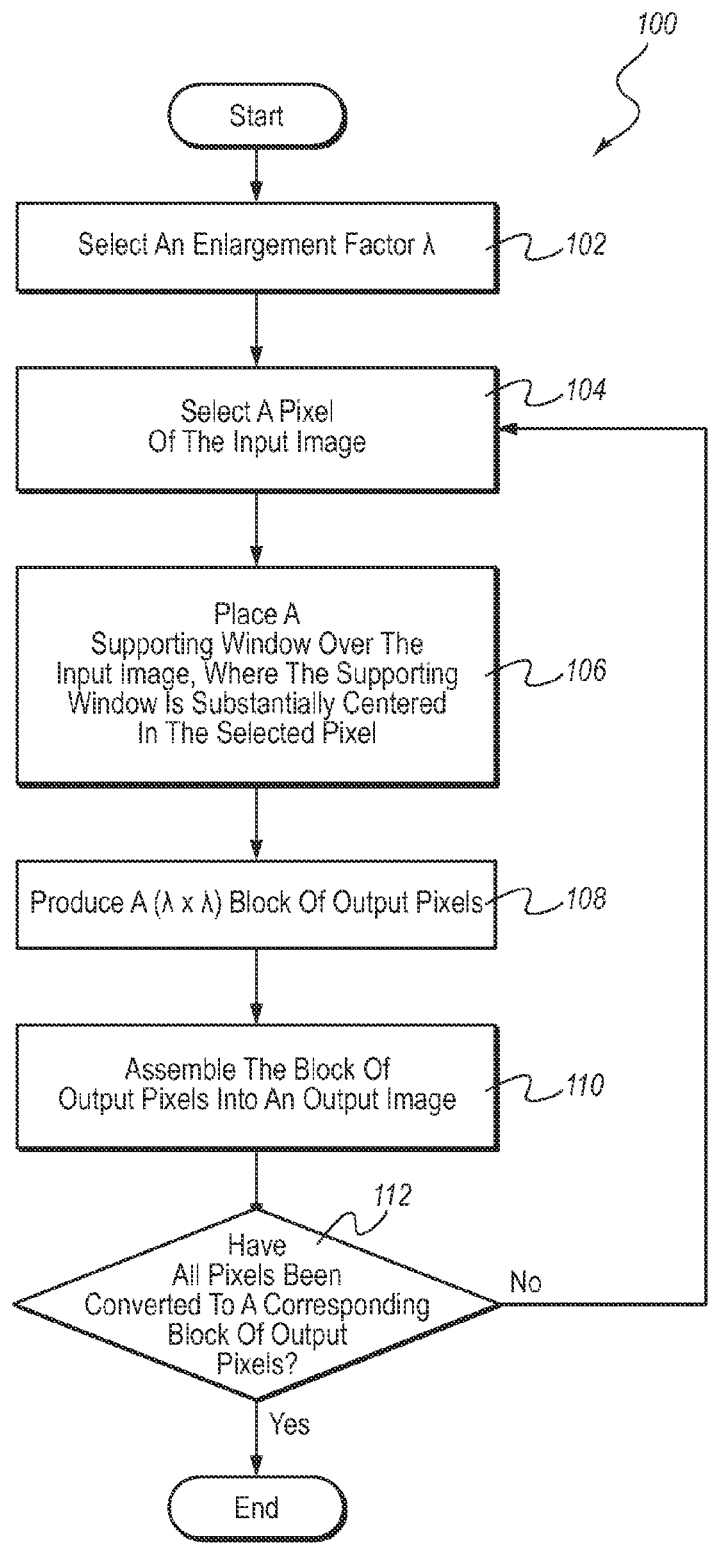
FIG. 1 discloses an example method for enlarging a digital image.

With reference now to FIG. 1, a first example method 100 for enlarging a digital image is disclosed. The example method 100 and variations thereof disclosed herein can be implemented using computer-readable media for carrying or having computer-executable instructions or data structures stored thereon. Such computer-readable media can be any available media that can be accessed by a processor of a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a processor of a general purpose or special purpose computer. Combinations of the above should also be included within the scope of computer-readable media.

Computer-executable instructions comprise, for example, instructions and data which cause a processor of a general purpose computer or a special purpose computer to perform a certain function or group of functions. Although the subject matter is described herein in language specific to methodological acts, it is to be understood that the subject matter defined in the appended claims is not necessarily limited to the specific acts described herein. Rather, the specific acts described herein are disclosed as example forms of implementing the claims.

Examples of special purpose computers include image processing devices such as digital cameras (an example of which includes, but is not limited to, the Epson R-D1 digital camera manufactured by Seiko Epson Corporation headquartered in Owa, Suwa, Nagano, Japan ("Seiko Epson")), digital camcorders, projectors, printers, scanners, copiers, portable photo viewers (examples of which include, but are not limited to, the Epson P-3000 or P-5000 portable photo viewers manufactured by Seiko Epson), portable movie player, or some combination thereof, such as a printer/scanner/copier combination (examples of which include, but are not limited to, the Epson Stylus Photo RX580, RX595, or RX680, the Epson Stylus CX4400, CX7400, CX8400, or CX9400Fax, and the Epson AcuLaser CX11NF manufactured by Seiko Epson) or a digital camera/camcorder combination. An image processing device may include image enlargement capability, for example, to allow a user to manually or automatically enlarge a digital image in order to magnify objects in the image. For example, a camera with this image enlargement capability may include one or more computer-readable media that implement the example method 100, or a computer connected to the camera may include one or more computer-readable media that implement the example method 100.

Figure 2:
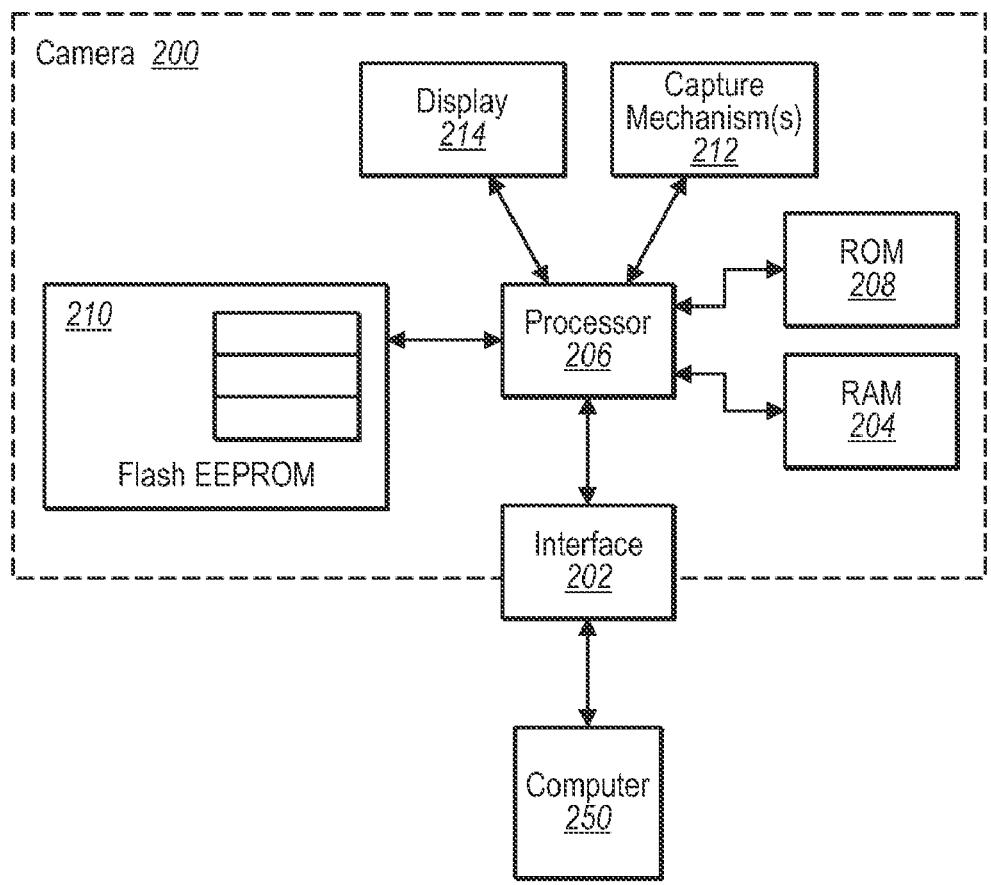
FIG. 2 is a schematic representation of an example camera.

A schematic representation of an example camera 200 is disclosed in FIG. 2. Camera 200 exchanges data with host computer 250 by way of an intervening interface 202. Application programs and a camera driver may also be stored for access on the host computer. When an image retrieve command is received from the application program, for example, the camera driver controls conversion of the command data to a format suitable for the camera 200 and sends the converted command data to the camera 200. The driver also receives and interprets various signals and data from the camera, and provides necessary information to the user by way of the host computer 250.

When data is sent by host computer 250, interface 202 receives the data and stores it in a receive buffer forming part of RAM 204. RAM 204 can be divided into a number of sections, for example through addressing, and allocated as different buffers, such as a receive buffer or a send buffer for example. Data, such as digital image data, can also be obtained by the camera from the capture mechanism(s) 212. For example, the capture mechanism(s) 212 can generate a digital photographic image of a real-world scene. This digital image can then be stored in the receive buffer or the send buffer of the RAM 204.

A processor 206 uses computer-executable instructions stored on the ROM 208 or in the flash EEPROM 210, for example, to perform a certain function or group of functions, such as the method 100 for example. Where the data in the receive buffer of the RAM 204 is a digital image, for example, the processor 206 can implement the methodological acts on the digital image of the method 100 to enlarge a digital image. Further processing in an imaging pipeline may then be performed on the enlarged digital image before the digital image is displayed by the camera 200 on the display 214 or transferred to the host computer 250, for example.

It is understood that digital images may be received by the camera 200 from sources other than the computer 250 and the capture mechanism(s) 212, including, but not limited to, the flash EEPROM 210 or the ROM 208. An example embodiment of the camera 200 includes, but is not limited to, the Epson R-D1 Digital Camera manufactured by Seiko Epson.

The example method 100 for enlarging a digital image will now be discussed in connection with FIG. 1.

At 102, an enlargement factor $\lambda$ is selected. For example, an enlargement factor $\lambda=2$ can be selected, although other integer enlargement factors could alternatively be selected.

At 104, a pixel in an input image is selected. The input image may be a $K_1 \times K_2$ gray-scale image x with pixels $x_{(r,s)}$, where r=1, 2, ..., $K_1$ and s=1, 2, ..., $K_2$ denote the image row and column, respectively. For example, where $K_1=600$ and $K_2=800$, the gray-scale image x is a 600×800 image. At 104, a pixel $x_{(4,3)}$ can be selected. It is noted that the input image could alternatively be a $K_1 \times K_2$ color input image, in which case the method 100 can alternatively be performed on each color channel separately.

At 106, a $(\lambda+\gamma) \times (\lambda+\gamma)$ supporting window is placed over the input image, the supporting window being substantially centered in the selected pixel. For example, where $\lambda=2$ and $\gamma=1$, a 3×3 supporting window can be placed over the input image x, with the supporting window centered in the pixel $x_{(4,3)}$, which was selected at 104.

At 108, a $\lambda \times \lambda$ block of output pixels is produced. For example, where $\lambda=2$, a selected pixel $x_{(r,s)}$ is converted into a 2×2 block of output pixels, $y_{(2r-1,2s-1)}, y_{(2r-1,2s)}, y_{(2r,2s-1)}, y_{(2r,2s)}$. Namely, for the input pixel $x_{(4,3)}$, the 2×2 block of output pixels consists of the following four pixels $y_{(7,5)}, y_{(7,6)}, y_{(8,5)}, y_{(8,6)}$.

At 110, the $\lambda \times \lambda$ block of output pixels is assembled into an output image. For example, the output image can be a $\lambda K_1 \times \lambda K_2$ gray-scale image y with pixels $y_{(k,l)}$, where k=1, 2, ..., $\lambda K_1$ and l=1, 2, ..., $\lambda K_2$ denote the image row and column, respectively.

At 112, the input image is evaluated to determine whether all pixels have been converted to a corresponding block in the output image. If all pixels of the input image have not yet been converted to a corresponding block in the output image, the acts 104-110 are repeated until all pixels of the input image have been converted. For example, where the input image x is a 600×800 digital image, the acts 104-110 will be repeated 480,000 times in order to convert all pixels in the input image x. Repeating the acts 104-110 for all pixels of the $K_1 \times K_2$ input image x produces the $\lambda K_1 \times \lambda K_2$ output image y noted above. It is noted that the enlarged output image y has a gray-scale format if the input image x is a gray-scale image, or a color format if the input image x is a color image.

The acts 104-112 can be performed according to the following equation:

$$y_{(\lambda(r-1)+a, \lambda(s-1)+b)} = \sum_{(p,q) \in \zeta} w_{(p,q)}^{a,b} x_{(p,q)} \quad (1)$$

where $w_{(p,q)}^{a,b}$ denotes the weight associated with the pixel $x_{(p,q)}$ of the input image, $a \in \{1, \ldots, \lambda\}$ and $b \in \{1, \ldots, \lambda\}$ denote the location indices in the $\lambda \times \lambda$ blocks of output pixels, and $\zeta = \{(r+i, s+j); -\lambda/2 \leq i \leq \lambda/2, -\lambda/2 \leq j \leq \lambda/2\}$ denotes the spatial locations in the input image, that is, $\zeta = \{(r-1,s-1), (r-1,s), (r-1,s+1), (r,s-1), (r,s), (r,s+1), (r+1,s-1), (r+1,s), (r+1,s+1)\}$ for a 3×3 window corresponding to $\lambda=2$ and $\gamma=1$.

In order to produce visually pleasing images, the contribution of the pixels $x_{(p,q)}$ of the input image to the $\lambda \times \lambda$ blocks of output pixels (for example, $y_{(2r-1,2s-1)}, y_{(2r-1,2s)}, y_{(2r,2s-1)}, y_{(2r,2s)}$, for $\lambda=2$) depends on both $(p,q)\in\zeta$ of the pixels inside the supporting window and the location of the output pixels denoted by parameters $\lambda$, a, and b.

Equation (1) uses $\lambda^2$ different weight matrices $w^{a,b} = \{w_{(p,q)}^{a,b}:(p,q)\in\zeta\}$. In order to avoid various visual impairments in the enlarged output image y, Equation (1) can be an unbiased estimator defined using the normalized weights $w_{(p,q)}^{a,b}$, that is, for some particular values of a and b:

$$\sum_{(p,q)\in\zeta} w_{(p,q)}^{a,b} = 1 \qquad (2)$$

It is also noted that in order to produce visually pleasing images, weight matrices may also satisfy the following symmetry constraints:

$$w^{a,b} \leftrightarrow w^{a,\lambda-b+1}$$

$$w^{a,b} \leftrightarrow w^{\lambda-a+1,b}$$

$$w^{a,b} \leftrightarrow w^{\lambda-a+1,\lambda-b+1}$$

where $\leftrightarrow$ denotes the symmetry relation.

First Example Embodiment

In a first example embodiment, $\lambda=2$. Thus, Equation (1) uses four different $(\lambda+\gamma)\times(\lambda+\gamma)$ weight matrices $w^{a,b} = \{w_{(p,q)}^{a,b}:(p,q)\in\zeta\}$ because $a\in\{1,2\}$ and $b\in\{1,2\}$. For $\gamma=1$, each of the weight matrices is defined as a 3×3 matrix:

$$w^{a,b} = \begin{bmatrix} w_{(r-1,s-1)}^{a,b} & w_{(r-1,s)}^{a,b} & w_{(r-1,s+1)}^{a,b} \\ w_{(r,s-1)}^{a,b} & w_{(r,s)}^{a,b} & w_{(r,s+1)}^{a,b} \\ w_{(r+1,s-1)}^{a,b} & w_{(r+1,s)}^{a,b} & w_{(r+1,s+1)}^{a,b} \end{bmatrix} \qquad (4)$$

It is noted that the weight matrices can be derived for each pixel location in the input image based on its statistics or they can be constant for the whole image in order to make the enlargement process more efficient, since in the latter case the weight matrices be calculated only once during the entire method 100.

Since the example method 100 can be considered as a low-pass filtering operation, the weight matrices $w^{a,b}$ can be set to follow the characteristics of a Gaussian low-pass filter with $\sigma=1$. To simplify the implementation of Equation (1) with such characteristics, the weights can be approximated using integer coefficients as follows:

$$w^{1,1} = \frac{1}{10}\begin{bmatrix} 1 & 2 & 0 \\ 2 & 5 & 0 \\ 0 & 0 & 0 \end{bmatrix}, \quad w^{1,2} = \frac{1}{10}\begin{bmatrix} 0 & 2 & 1 \\ 0 & 5 & 2 \\ 0 & 0 & 0 \end{bmatrix} \qquad (5)$$

$$w^{2,1} = \frac{1}{10}\begin{bmatrix} 0 & 0 & 0 \\ 2 & 5 & 0 \\ 1 & 2 & 0 \end{bmatrix}, \quad w^{2,2} = \frac{1}{10}\begin{bmatrix} 0 & 0 & 0 \\ 0 & 5 & 2 \\ 0 & 2 & 1 \end{bmatrix}$$

As can be seen, all weight matrices of Equation (5) assign the largest weight to the window center (r,s) in order to emphasize the central pixel $x_{(r,s)}$ due to its highest relevance to each pixel inside the corresponding block of output pixels $\{y_{(\lambda(r-1)+a,\lambda(s-1)+b)}\}$. In addition, nonzero weights are assigned to the neighboring samples in the relevant interpolation direction to ensure smooth edges in the interpolated image.

Thus, the interpolated image y can be obtained using Equation (1) with the set of distinct weight matrices from Equation (5). Note that the interpolation process in Equation (1) is performed for $r=1, 2, \ldots, K_1$ and $s=1, 2, \ldots, K_2$.

The first example embodiment of the method 100 can produce higher quality images than bilinear interpolation. In terms of computational efficiency, the first example embodiment example method 100 can significantly outperform bicubic interpolation.

Second Example Embodiment

The weights in Equation (5) have the characteristics of low-pass filtering. It is noted, however, that the weights in Equation (1) may allow for simultaneous low-pass and high-pass filtering. Performing spatial interpolation with such hybrid (low-pass and high-pass) characteristics requires using a larger area of support. However, because the use of a large supporting window can increase computational complexity of the example method 100, the supporting window may be restricted in size, for example, to $\gamma=3$, resulting in a supporting window covering $(\lambda+3)\times(\lambda+3)$ pixels.

In a second example embodiment, $\lambda=2$ and $\gamma=3$. In this second example embodiment, therefore, joint spatial interpolation and edge enhancement may be performed using Equation (1) with a 5×5 supporting window described by $\zeta=\{(r+i,s+j);-\lambda/2-1\leq i\leq\lambda/2+1,-\lambda/2-1\leq j\leq\lambda/2+1\}$ and four weight matrices $w^{a,b}$ which are defined as follows:

$$w^{a,b} = \begin{bmatrix} w_{(r-2,s-2)}^{a,b} & w_{(r-2,s-1)}^{a,b} & w_{(r-2,s)}^{a,b} & w_{(r-2,s+1)}^{a,b} & w_{(r-2,s+2)}^{a,b} \\ w_{(r-1,s-2)}^{a,b} & w_{(r-1,s-1)}^{a,b} & w_{(r-1,s)}^{a,b} & w_{(r-1,s+1)}^{a,b} & w_{(r-1,s+2)}^{a,b} \\ w_{(r,s-2)}^{a,b} & w_{(r,s-1)}^{a,b} & w_{(r,s)}^{a,b} & w_{(r,s+1)}^{a,b} & w_{(r,s+2)}^{a,b} \\ w_{(r+1,s-2)}^{a,b} & w_{(r+1,s-1)}^{a,b} & w_{(r+1,s)}^{a,b} & w_{(r+1,s+1)}^{a,b} & w_{(r+1,s+2)}^{a,b} \\ w_{(r+2,s-2)}^{a,b} & w_{(r+2,s-1)}^{a,b} & w_{(r+2,s)}^{a,b} & w_{(r+2,s+1)}^{a,b} & w_{(r+2,s+2)}^{a,b} \end{bmatrix} \qquad (6)$$

Since Laplacian filtering is one of the most efficient high-pass filters and similar to the weight vectors in Equation (5), Laplacian filtering can be incorporated into example weight matrices according to Equation (6), as can the symmetry constraints of Equation (3). For example, where $\lambda=2$, the above properties are satisfied by the following weight matrices:

$$w^{1,1} = \frac{1}{80}\begin{bmatrix} -1 & -3 & -3 & -2 & 0 \\ -3 & 7 & 24 & -7 & 0 \\ -3 & 24 & 75 & -7 & 0 \\ -2 & -7 & -7 & -5 & 0 \\ 0 & 0 & 0 & 0 & 0 \end{bmatrix}, \qquad (7)$$

$$w^{1,2} = \frac{1}{80}\begin{bmatrix} 0 & -2 & -3 & -3 & -1 \\ 0 & -7 & 24 & 7 & -3 \\ 0 & -7 & 75 & 24 & -3 \\ 0 & -5 & -7 & -7 & -2 \\ 0 & 0 & 0 & 0 & 0 \end{bmatrix}$$

-continued $$w^{2,1} = \frac{1}{80}\begin{bmatrix} 0 & 0 & 0 & 0 & 0 \\ -2 & -7 & -7 & -5 & 0 \\ -3 & 24 & 75 & -7 & 0 \\ -3 & 7 & 24 & -7 & 0 \\ -1 & -3 & -3 & -2 & 0 \end{bmatrix},$$

$$w^{2,2} = \frac{1}{80}\begin{bmatrix} 0 & 0 & 0 & 0 & 0 \\ 0 & -5 & -7 & -7 & -2 \\ 0 & -7 & 75 & 24 & -3 \\ 0 & -7 & 24 & 7 & -3 \\ 0 & -2 & -3 & -3 & -1 \end{bmatrix}$$

which allow for joint spatial interpolation and image enhancement due to the use of both low-pass and high-pass filter characteristics during processing.

Similar to Equation (5), the weight matrices in Equation (7) emphasize the central pixel $x_{(r,s)}$ and the relevant interpolation direction. They also satisfy the symmetry constraint according to Equation (3). The presence of the negative weights in Equation (7) results in joint spatial interpolation and edge enhancement.

Operating in all (r,s) locations of the input image x, for r=1, 2, ..., $K_1$ and s=1, 2, ..., $K_2$, the enlarged image y with enhanced edge information can be obtained by Equation (1) with the weights from Equation (7). Due in part to the constant set of four weight matrices from Equation (7), Equation (1) is relatively fast and simple to implement in hardware and/or software.

The second example embodiment of the method 100 can produce images of much higher quality than that of bicubic interpolation. In terms of computational efficiency, the second example embodiment example method 100 is comparable with bicubic interpolation.

Third Example Embodiment

As disclosed in connection with the second example embodiment, Equation (1) may simultaneously allow both image enlargement and edge enhancement which correspond, respectively, to low-pass filtering and high-pass filtering. To accomplish both results simultaneously using Equation (1), each matrix $w^{a,b}$ may contain both positive and negative coefficients, as the desired hybrid filter characteristics can be obtained via a mixture of Gaussian (low-pass) and Laplacian (high-pass) operators.

In order to obtain higher flexibility and performance and avoid insufficient or excessive enhancement in this third example embodiment, the amount of edge enhancement may be tuned via a parameter. The parameter can be predetermined in the imaging device or software by the manufacturer or it can be controlled by the end-user or set adaptively based on image statistics.

Since each normalized weight $w_{(p,q)}^{a,b}$ can be expressed as $$w_{(p,q)}^{a,b} = u_{(p,q)}^{a,b}/U^{a,b} \text{ with } U^{a,b} = \sum_{(p,q) \in \zeta} u_{(p,q)}^{a,b} \quad (8)$$

where $u_{(p,q)}^{a,b}$ is a non-normalized weight, Equation (1) can be rewritten as follows:

$$y_{(\lambda(r-1)+a,\lambda(s-1)+b)} = \frac{1}{U^{a,b}} \sum_{(p,q) \in \zeta} u_{(p,q)}^{a,b} x_{(p,q)} \quad (9)$$

Thus, each of $w^{a,b}$ from Equation (6) can be written as follows:

$$w^{a,b} = \frac{1}{U^{a,b}}\begin{bmatrix} u_{(r-2,s-2)}^{a,b} & u_{(r-2,s-1)}^{a,b} & u_{(r-2,s)}^{a,b} & u_{(r-2,s+1)}^{a,b} & u_{(r-2,s+2)}^{a,b} \\ u_{(r-1,s-2)}^{a,b} & u_{(r-1,s-1)}^{a,b} & u_{(r-1,s)}^{a,b} & u_{(r-1,s+1)}^{a,b} & u_{(r-1,s+2)}^{a,b} \\ u_{(r,s-2)}^{a,b} & u_{(r,s-1)}^{a,b} & u_{(r,s)}^{a,b} & u_{(r,s+1)}^{a,b} & u_{(r,s+2)}^{a,b} \\ u_{(r+1,s-2)}^{a,b} & u_{(r+1,s-1)}^{a,b} & u_{(r+1,s)}^{a,b} & u_{(r+1,s+1)}^{a,b} & u_{(r+1,s+2)}^{a,b} \\ u_{(r+2,s-2)}^{a,b} & u_{(r+2,s-1)}^{a,b} & u_{(r+2,s)}^{a,b} & u_{(r+2,s+1)}^{a,b} & u_{(r+2,s+2)}^{a,b} \end{bmatrix} \quad (10)$$

In order for $w^{a,b}$ to have both low-pass and high-pass filter characteristics, each of the $u_{(p,q)}^{a,b}$ weights can be expressed as follows:

$$u_{(p,q)}^{a,b} = L_{(p,q)}^{a,b} + H_{(p,q)}^{a,b}, \text{ for } (p,q) \in \zeta \quad (11)$$

where $L_{(p,q)}^{a,b}$ and $H_{(p,q)}^{a,b}$ denote, respectively, low-pass and high-pass filtering components of $u_{(p,q)}^{a,b}$. Note that following the design characteristics of the Laplacian high-pass filter and the Gaussian low-pass filter, the weight components may have ranges of $L_{(p,q)}^{a,b} \in (-\infty, 0]$ and $H_{(p,q)}^{a,b} \in [0,\infty)$.

In order to allow easy control of the edge-enhancement process, Equation (10) may use a standard Laplacian operator; however, the amount of enhancement performed during image enlargement may be controlled via a gain parameter $\alpha \in (0,\infty)$. In addition to enhancing the edges, increasing $\alpha$ amplifies the level of noise in the image. Therefore, the benefits of edge enhancement must be balanced against the burdens of amplifying the level of noise in the image. For example, $\alpha \in (0,3)$ generally maintains the level of noise in an acceptable range. The $\alpha$-based normalization of the weights in Equation (10) may be performed via $L^{a,b}/\alpha$ with $L^{a,b}=8$ denoting the number of negative unity weights in a 3×3 Laplacian filter's mask.

The level of smoothness of the enlarged image is controlled using $H_{(p,q)}^{a,b}$ components. The component $H_{(p,q)}^{a,b}$ may be a function of $\alpha$ as follows:

$$H_{(p,q)}^{a,b} = G_{(p,q)}^{a,b} \frac{L^{a,b}(1+\alpha)}{\alpha} \quad (12)$$

where $G_{(p,q)}^{a,b}$ is the coefficient of the Gaussian low-pass filter.

The actual value of $L_{(p,q)}^{a,b}$ may be expressed as the combination of $G_{(m,n)}^{a,b}$ values in a $(\lambda+1) \times (\lambda+1)$ neighborhood centered in (p,q), as follows:

$$L_{(p,q)}^{a,b} = -\sum_{\substack{(m,n) \in \theta \\ (m,n) \in \zeta}} G_{(m,n)}^{a,b}, \text{ for } (m,n) \neq (p,q) \quad (13)$$

where $\theta = \{(m+i, n+j); -1 \leq i \leq 1, -1 \leq j \leq 1\}$ denotes an area of support corresponding to a 3×3 Laplacian filter's mask with $L^{a,b}=8$. Note that $(m,n) \neq (p,q)$ because the center of the masks used in Laplacian filtering does not have a negative value. In order to reduce computational complexity as much as possible, the number of nonzero $G_{(p,q)}^{a,b}$ components may be maintained at a low level. For example, for the 5×5 matrix from Equation (10), $\lambda^2$ (i.e., four for $\lambda=2$) nonzero $G_{(p,q)}^{a,b}$ components grouped in a $\lambda \times \lambda$ block which contains the (r,s) location may be used. Because of the Gaussian low-pass filter characteristics, $G_{(r,s)}^{a,b}$ should have the largest value and the value of other nonzero $G_{(p,q)}^{a,b}$ values may be reduced as the distance between (p,q) and (r,s) locations increases. Note that a=1 and b=1 dictate that nonzero $G_{(p,q)}^{a,b}$ components are located in $\{(r-1,s-1),(r-1,s),(r,s-1),(r,s)\}$. Based on the symmetry constraint of Equation (3), other example configurations of nonzero $G_{(p,q)}^{a,b}$ components include $\{(r-1,s),(r-1,s+1),(r,s),(r,s+1)\}$ for a=1 and b=2, $\{(r,s-1),(r,s),(r+1,s-1),(r+1,s)\}$ for a=2 and b=1, and $\{(r,s),(r,s+1),(r+1,s),(r+1,s+1)\}$ for a=2 and b=2.

Similar to high-pass filtering, the low-pass filter may be normalized. Combining high-pass and low-pass normalization values, the normalization parameter $U^{a,b}$ in Equation (8) may be expressed as follows:

$$U^{a,b} = \frac{L^{a,b}}{\alpha} \sum_{(p,q) \in \zeta} G_{(p,q)}^{a,b} \quad (14)$$

The third example embodiment employs $\lambda$, $\alpha$, and $G_{(p,q)}^{a,b}$ values. For example, for $\lambda=2$ high-quality enlarged images may be produced with $G_{(r-1,s-1)}^{1,1}=1$, $G_{(r-1,s)}^{1,1}=2$, $G_{(r,s-1)}^{1,1}=2$, $G_{(r,s)}^{1,1}=5$. A more efficient implementation that maintains reasonable performance can be achieved by setting these four $G_{(p,q)}^{a,b}$ terms to $\{2,3,3,8\}$ or $\{3,7,7,15\}$. The $\alpha$ parameter can be determined adaptively in each (r,s) position based on the local statistics of the input image x, which requires that the weight matrices $w^{a,b}$ be recalculated in each pixel position during the method 100. However, cost effective implementations may use a predetermined $\alpha$ or an $\alpha$ set by the user, which requires that the weight matrices be calculated only once during the entire method 100. The weight matrices, such as matrices of Equation (10), are constructed using Equations (11) to (14). Additional cost reduction can be achieved due to the symmetry constraint of Equation (3) imposed on the construction of the weight matrices.

The example embodiments disclosed herein may be embodied in other specific forms. The example embodiments disclosed herein are to be considered in all respects only as illustrative and not restrictive.

What is claimed is:

1. A method for enlarging a digital image, the method comprising:
   (1) selecting an enlargement factor $\lambda$ for an input image;
   (2) selecting a pixel in the input image;
   (3) placing a $(\lambda+\gamma) \pm (\lambda+\gamma)$ supporting window over the input image, the supporting window being substantially centered in the selected pixel, wherein $\gamma$ is an integer value;
   (4) producing a $\lambda \times \lambda$ block of output pixels, wherein each pixel in the block of output pixels is produced by multiplying the pixels located inside the supporting window by one of a set of $\lambda^2$ distinct $(\lambda+\gamma) \times (\lambda+\gamma)$ weight; matrices and summing the results;
   (5) assembling the block of output pixels into an output image; and
   (6) repeating (2)-(5) for each of the remaining pixels in the input image.

2. The method as recited in claim 1, wherein a single set of distinct weight matrices is used to produce each of the blocks of output pixels.

3. The method as recited in claim 1, wherein multiple sets of distinct weight matrices are used to produce the blocks of output pixels, where each of the multiple sets of distinct weight matrices is derived for each pixel location in the input image based on input image statistics.

4. The method as recited in claim 1, wherein (2)-(6) are performed according to the following equation:

$$y_{(\lambda(r-1)+a, \lambda(s-1)+b)} = \sum_{(p,q) \in \zeta} w_{(p,q)}^{a,b} x_{(p,q)}$$

where:
$w_{(p,q)}^{a,b}$ denotes the weight associated with the pixel $x_{(p,q)}$ of the input image,
$a \in \{1, \ldots, \lambda\}$ and $b \in \{1, \ldots, \lambda\}$ denote the location indices in the $\lambda \times \lambda$ blocks of output pixels,
$\zeta = \{(r+i, s+j); -\lambda/2 \leq i \leq \lambda/2, -\lambda/2 \leq j \leq \lambda/2\}$ denotes the spatial locations in the input image if $\gamma=1$; and
$\zeta = \{(r+i, s+j); -\lambda/2-1 \leq i \leq \lambda/2+1, -\lambda/2-1 \leq j \leq \lambda/2+1\}$ denotes the spatial locations in the input image if $\gamma=3$.

5. The method as recited in claim 4, wherein the weights $w_{(p,q)}^{a,b}$ are normalized such that they conform to the following constraint:

$$\sum_{(p,q) \in \zeta} w_{(p,q)}^{a,b} = 1.$$

6. The method as recited in claim 5, wherein:
$\lambda=2$ and $\gamma=1$; and
the set of four distinct 3×3 weight matrices comprise:

$$w^{1,1} = \frac{1}{10}\begin{bmatrix} 1 & 2 & 0 \\ 2 & 5 & 0 \\ 0 & 0 & 0 \end{bmatrix}, w^{1,2} = \frac{1}{10}\begin{bmatrix} 0 & 2 & 1 \\ 0 & 5 & 2 \\ 0 & 0 & 0 \end{bmatrix}$$

$$w^{2,1} = \frac{1}{10}\begin{bmatrix} 0 & 0 & 0 \\ 2 & 5 & 0 \\ 1 & 2 & 0 \end{bmatrix}, w^{2,2} = \frac{1}{10}\begin{bmatrix} 0 & 0 & 0 \\ 0 & 5 & 2 \\ 0 & 2 & 1 \end{bmatrix}.$$

7. The method as recited in claim 5, wherein the set of distinct weight matrices are configured for both spatial interpolation as well as image enhancement.

8. The method as recited in claim 7, wherein:
$\lambda=2$ and $\gamma=3$; and
the set of four distinct 5×5 weight matrices comprise:

$$w^{1,1} = \frac{1}{80}\begin{bmatrix} -1 & -3 & -3 & -2 & 0 \\ -3 & 7 & 24 & -7 & 0 \\ -3 & 24 & 75 & -7 & 0 \\ -2 & -7 & -7 & -5 & 0 \\ 0 & 0 & 0 & 0 & 0 \end{bmatrix},$$

$$w^{1,2} = \frac{1}{80}\begin{bmatrix} 0 & -2 & -3 & -3 & -1 \\ 0 & -7 & 24 & 7 & -3 \\ 0 & -7 & 75 & 24 & -3 \\ 0 & -5 & -7 & -7 & -2 \\ 0 & 0 & 0 & 0 & 0 \end{bmatrix}$$

-continued $$w^{2,1} = \frac{1}{80}\begin{bmatrix} 0 & 0 & 0 & 0 & 0 \\ -2 & -7 & -7 & -5 & 0 \\ -3 & 24 & 75 & -7 & 0 \\ -3 & 7 & 24 & -7 & 0 \\ -1 & -3 & -3 & -2 & 0 \end{bmatrix},$$

$$w^{2,2} = \frac{1}{80}\begin{bmatrix} 0 & 0 & 0 & 0 & 0 \\ 0 & -5 & -7 & -7 & -2 \\ 0 & -7 & 75 & 24 & -3 \\ 0 & -7 & 24 & 7 & -3 \\ 0 & -2 & -3 & -3 & -1 \end{bmatrix}.$$

9. The method as recited in claim 5, wherein each normalized weight $w_{(p,q)}^{a,b}$ can be expressed as follows:

$$w_{(p,q)}^{a,b} = u_{(p,q)}^{a,b}/U^{a,b} \text{ with } U^{a,b} = \sum_{(p,q)\in\zeta} u_{(p,q)}^{a,b}$$

where $u_{(p,q)}^{a,b}$ is a non-normalized weight.

10. The method as recited in claim 9, wherein each of the $u_{(p,q)}^{a,b}$ weights can be expressed as follows:

$$u_{(p,q)}^{a,b} = L_{(p,q)}^{a,b} + H_{(p,q)}^{a,b}, \text{ for } (p,q)\in\zeta$$

where $L_{(p,q)}^{a,b}$ and $H_{(p,q)}^{a,b}$ denote, respectively, low-pass and high-pass filtering components of $u_{(p,q)}^{a,b}$, having ranges of $L_{(p,q)}^{a,b}\in(-\infty,0]$ and $H_{(p,q)}^{a,b}\in[0,\infty)$.

11. The method as recited in claim 10, wherein:

$$H_{(p,q)}^{a,b} = G_{(p,q)}^{a,b}\frac{L^{a,b}(1+\alpha)}{\alpha}$$

where $G_{(p,q)}^{a,b}$ is the coefficient of the Gaussian low-pass filter; and $\alpha\in(0,\infty)$ is a gain parameter.

12. The method as recited in claim 11, wherein:

$$L_{(p,q)}^{a,b} = -\sum_{\substack{(m,n)\in\theta \\ (m,n)\in\zeta}} G_{(m,n)}^{a,b}, \text{ for } (m,n) \neq (p,q)$$

where $\theta=\{(m+i,n+j); -1\leq i\leq 1, -1\leq j\leq 1\}$.

13. The method as recited in claim 12, wherein:

$$U^{a,b} = \frac{L^{a,b}}{\alpha}\sum_{(p,q)\in\zeta} G_{(p,q)}^{a,b}.$$

14. The method as recited in claim 13, wherein:

$G_{(r-1,s-1)}^{1,1}=1, G_{(r-1,s)}^{1,1}=2, G_{(r,s-1)}^{1,1}=2, G_{(r,s)}^{1,1}=5;$ $G_{(r-1,s-1)}^{1,1}=2, G_{(r-1,s)}^{1,1}=3, G_{(r,s-1)}^{1,1}=3, G_{(r,s)}^{1,1}=8;$ or $G_{(r-1,s-1)}^{1,1}=3, G_{(r-1,s)}^{1,1}=7, G_{(r,s-1)}^{1,1}=7, G_{(r,s)}^{1,1}=15.$

15. The method as recited in claim 5, wherein the set of distinct weight matrices conform to the following symmetry constraints:

$w^{a,b} \leftrightarrow w^{a,\lambda-b+1}$ $w^{a,b} \leftrightarrow w^{\lambda-a+1,b}$ $w^{a,b} \leftrightarrow w^{\lambda-a+1,\lambda-b+1}$ where $\leftrightarrow$ denotes the symmetry relation.

16. One or more non-transitory computer-readable media having computer-readable instructions thereon which, when executed, implement a method for enlarging a digital image, the method comprising:
  (1) selecting an enlargement factor $\lambda$ for an input image;
  (2) selecting a pixel in the input image;
  (3) placing a $(\lambda+\gamma)\times(\lambda+\gamma)$ supporting window over the input image, the supporting window being substantially centered in the selected pixel, wherein $\gamma$ is an integer value;
  (4) producing a $\lambda\times\lambda$ block of output pixels, wherein each pixel in the block of output pixels is produced by multiplying the pixels located inside the supporting window by one of a set of $\lambda^2$ distinct $(\lambda+\gamma)\times(\lambda+\gamma)$ weight; matrices and summing the results;
  (5) assembling the block of output pixels into an output image; and
  (6) repeating (2)-(5) for each of the remaining pixels in the input image.

17. The one or more computer-readable media recited in claim 16, wherein a single set of distinct weight matrices is used to produce each of the blocks of output pixels.

18. The one or more computer-readable media recited in claim 16, wherein multiple sets of distinct weight matrics are used to produce the blocks of output pixels, where each of the multiple sets of distinct weight matrics is derived for each pixel location in the input image based on input image statistics.

19. The one or more computer-readable media recited in claim 16, wherein (2)-(6) are performed according to the following equation:

$$y(\lambda(r-1)+a,\lambda(s-1)+b) = \sum_{(p,q)\in\zeta} w_{(p,q)}^{a,b} x_{(p,q)}$$

where:
  $w_{(p,q)}^{a,b}$ denotes the weight associated with the pixel $x_{(p,q)}$ of the input image,
  $a\in\{1,\ldots,\lambda\}$ and $b\in\{1,\ldots,\lambda\}$ denote the location indices in the $\lambda\times\lambda$ blocks of output pixels,
  $\zeta=\{(r+i,s+j); -\lambda/2\leq i\leq\lambda/2, -\lambda/2\leq j\leq\lambda/2\}$ denotes the spatial locations in the input image if $\gamma=1$;
  $\zeta=\{(r+i,s+j); -\lambda/2-1\leq i\leq\lambda/2+1, -\lambda/2-1\leq j\leq\lambda 2+1\}$ denotes the spatial locations in the input image if $\gamma=3$; and
  the weights $w_{(p,q)}^{a,b}$ are normalized such that they conform to the following constraint:

$$\sum_{(p,q)\in\zeta} w_{(p,q)}^{a,b} = 1.$$

20. The one or more computer-readable media recited in claim 19, wherein:
  $\lambda=2$ and $\gamma=1$; and
  the set of four distinct 3×3 weight matrices comprise:

$$w^{1,1} = \frac{1}{10}\begin{bmatrix} 1 & 2 & 0 \\ 2 & 5 & 0 \\ 0 & 0 & 0 \end{bmatrix}, w^{1,2} = \frac{1}{10}\begin{bmatrix} 0 & 2 & 1 \\ 0 & 5 & 2 \\ 0 & 0 & 0 \end{bmatrix}$$

$$w^{2,1} = \frac{1}{10}\begin{bmatrix} 0 & 0 & 0 \\ 2 & 5 & 0 \\ 1 & 2 & 0 \end{bmatrix}, w^{2,2} = \frac{1}{10}\begin{bmatrix} 0 & 0 & 0 \\ 0 & 5 & 2 \\ 0 & 2 & 1 \end{bmatrix}.$$

21. The one or more computer-readable media recited in claim 19, wherein:

$\lambda=2$ and $\gamma=3$; and the set of four distinct 5×5 weight matrices comprise:

$$w^{1,1} = \frac{1}{80}\begin{bmatrix} -1 & -3 & -3 & -2 & 0 \\ -3 & 7 & 24 & -7 & 0 \\ -3 & 24 & 75 & -7 & 0 \\ -2 & -7 & -7 & -5 & 0 \\ 0 & 0 & 0 & 0 & 0 \end{bmatrix},$$

$$w^{1,2} = \frac{1}{80}\begin{bmatrix} 0 & -2 & -3 & -3 & -1 \\ 0 & -7 & 24 & 7 & -3 \\ 0 & -7 & 75 & 24 & -3 \\ 0 & -5 & -7 & -7 & -2 \\ 0 & 0 & 0 & 0 & 0 \end{bmatrix},$$

$$w^{2,1} = \frac{1}{80}\begin{bmatrix} 0 & 0 & 0 & 0 & 0 \\ -2 & -7 & -7 & -5 & 0 \\ -3 & 24 & 75 & -7 & 0 \\ -3 & 7 & 24 & -7 & 0 \\ -1 & -3 & -3 & -2 & 0 \end{bmatrix},$$

$$w^{2,2} = \frac{1}{80}\begin{bmatrix} 0 & 0 & 0 & 0 & 0 \\ 0 & -5 & -7 & -7 & -2 \\ 0 & -7 & 75 & 24 & -3 \\ 0 & -7 & 24 & 7 & -3 \\ 0 & -2 & -3 & -3 & -1 \end{bmatrix}.$$

22. The one or more computer-readable media recited in claim 19, wherein each normalized weight $w_{(p,q)}^{a,b}$ can be expressed as follows:

$$w_{(p,q)}^{a,b} = u_{(p,q)}^{a,b}/U^{a,b} \text{ with } U^{a,b} = \sum_{(p,q)\in\zeta} u_{(p,q)}^{a,b}$$

where $u_{(p,q)}^{a,b}$ is a non-normalized weight, and each of the $u_{(p,q)}^{a,b}$ weights can be expressed as follows:

$$u_{(p,q)}^{a,b} = L_{(p,q)}^{a,b} + H_{(p,q)}^{a,b}, \text{ for } (p,q)\in\zeta$$

where $L_{(p,q)}^{a,b}$ and $H_{(p,q)}^{a,b}$ denote, respectively, low-pass and high-pass filtering components of $u_{(p,q)}^{a,b}$, having ranges of $L_{(p,q)}^{a,b}\in(-\infty,0]$ and $H_{(p,q)}^{a,b}\in[0,\infty)$.

23. An image processing device comprising:

a processor; and one or more computer-readable media having computer-readable instructions thereon which, when executed by the processor, implement a method for enlarging a digital image, the method comprising:

(1) selecting an enlargement factor $\lambda$ for an input image;

(2) selecting a pixel in the input image;

(3) placing a $(\lambda+\gamma)\times(\lambda+\gamma)$ supporting window over the input image, the supporting window being substantially centered in the selected pixel, wherein $\gamma$ is an integer value;

(4) producing a $\lambda\times\lambda$ block of output pixels, wherein each pixel in the block of output pixels is produced by multiplying the pixels located inside the supporting window by one of a set of $\lambda^2$ distinct $(\lambda+\gamma)\times(\lambda+\gamma)$ weight; matrices and summing the results;

(5) assembling the block of output pixels into an output image; and (6) repeating (2)-(5) for each of the remaining pixels in the input image, wherein a single set of distinct weight matrices are used to produce each of the blocks of output pixels.

24. The image processing device as recited in claim 19, wherein the image processing device comprises a printer, a scanner, a digital camera, a digital camcorder, a portable photo viewer, or some combination thereof.

* * * * *

UNITED STATES PATENT AND TRADEMARK OFFICE
CERTIFICATE OF CORRECTION

PATENT NO. : 8,078,007 B2
APPLICATION NO. : 11/970580
DATED : December 13, 2011
INVENTOR(S) : Rastislav Lukac It is certified that error appears in the above-identified patent and that said Letters Patent is hereby corrected as shown below:

Column 9,
Line 55, please change "$(\lambda + y) \pm (\lambda + y)$" to --$(\lambda + y) \times (\lambda + y)$--

Column 10,
Line 17, please change "$w_{(p,q)}{}^{a,b}$" to --$w_{(p,q)}^{a,b}$--
Line 26, please change "$w_{(p,q)}{}^{a,b}$" to --$w_{(p,q)}^{a,b}$--

Column 11,
Line 17, please change "$w_{(p,q)}{}^{a,b}$" to --$w_{(p,q)}^{a,b}$--
Line 24, please change "$u_{(p,q)}{}^{a,b}$" to --$u_{(p,q)}^{a,b}$--
Line 26, please change "$u_{(p,q)}{}^{a,b}$" to --$u_{(p,q)}^{a,b}$--
Line 27, please change "$u_{(p,q)}{}^{a,b} = L_{(p,q)}{}^{a,b} + H_{(p,q)}{}^{a,b}$ for $(p,q) \in \zeta$" to --$u_{(p,q)}^{a,b} = L_{(p,q)}^{a,b} + H_{(p,q)}^{a,b}$, for $(p,q) \in \zeta$--
Line 28, please change "$L_{(p,q)}{}^{a,b}$ and $H_{(p,q)}{}^{a,b}$" to --$L_{(p,q)}^{a,b}$ and $H_{(p,q)}^{a,b}$--
Line 29, please change "$u_{(p,q)}{}^{a,b}$" to --$u_{(p,q)}^{a,b}$--
Line 30, please change "$L_{(p,q)}{}^{a,b} \in (-\infty, 0]$ and $H_{(p,q)}{}^{a,b} \in [0, \infty)$" to --$L_{(p,q)}^{a,b} \in (-\infty, 0]$ and $H_{(p,q)}^{a,b} \in [0, \infty)$--
Line 36, please change "$G_{(p,q)}{}^{a,b}$" to --$G_{(p,q)}^{a,b}$--
Line 56, please change "$G_{(r-1,s-1)}{}^{1,1} = 1, G_{(r-1,s)}{}^{1,1} = 2, G_{(r,s-1)}{}^{1,1} = 2, G_{(r,s)}{}^{1,1} = 5;$" to --$G_{(r-1,s-1)}^{1,1} = 1, G_{(r-1,s)}^{1,1} = 2, G_{(r,s-1)}^{1,1} = 2, G_{(r,s)}^{1,1} = 5;$--

Signed and Sealed this
Twenty-seventh Day of March, 2012

David J. Kappos
*Director of the United States Patent and Trademark Office*

Line 57, please change "$G_{(r-1,s-1)}^{1,1}=2$, $G_{(r-1,s)}^{1,1}=3$, $G_{(r,s-1)}^{1,1}=3$, $G_{(r,s)}^{1,1}=8$; or," to -- $G_{(r-1,s-1)}^{1,1}=2$, $G_{(r-1,s)}^{1,1}=3$, $G_{(r,s-1)}^{1,1}=3$, $G_{(r,s)}^{1,1}=8$; or --

Line 58, please change "$G_{(r-1,s-1)}^{1,1}=3$, $G_{(r-1,s)}^{1,1}=7$, $G_{(r,s-1)}^{1,1}=7$, $G_{(r,s)}^{1,1}=15$;" to -- $G_{(r-1,s-1)}^{1,1}=3$, $G_{(r-1,s)}^{1,1}=7$, $G_{(r,s-1)}^{1,1}=7$, $G_{(r,s)}^{1,1}=15$ --

Line 65, please change "$\mathbf{w}^{a,b} \leftrightarrow \mathbf{w}^{\lambda a+1,\lambda b+1}$" to -- $\mathbf{w}^{a,b} \leftrightarrow \mathbf{w}^{\lambda-a+1,\lambda-b+1}$ --

Column 12,

Line 37, please change "$w_{(p,q)}^{a,b}$" to -- $w_{(p,q)}^{a,b}$ --

Line 46, please change "$w_{(p,q)}^{a,b}$" to -- $w_{(p,q)}^{a,b}$ --

Column 13,

Line 35, please change "$w_{(p,q)}^{a,b}$" to -- $w_{(p,q)}^{a,b}$ --

Column 14,

Line 1, please change "$u_{(p,q)}^{a,b}$" to -- $u_{(p,q)}^{a,b}$ --

Line 2, please change "$u_{(p,q)}^{a,b}$" to -- $u_{(p,q)}^{a,b}$ --

Line 5, please change "$u_{(p,q)}^{a,b} = L_{(p,q)}^{a,b} + H_{(p,q)}^{a,b}$ for $(p,q) \in \zeta$" to -- $u_{(p,q)}^{a,b} = L_{(p,q)}^{a,b} + H_{(p,q)}^{a,b}$, for $(p,q) \in \zeta$ --

Line 6, please change "$L_{(p,q)}^{a,b}$ and $H_{(p,q)}^{a,b}$" to -- $L_{(p,q)}^{a,b}$ and $H_{(p,q)}^{a,b}$ --

Line 7, please change "$u_{(p,q)}^{a,b}$" to -- $u_{(p,q)}^{a,b}$, -- and

Line 8, please change "$L_{(p,q)}^{a,b} \in (-\infty,0]$ $H_{(p,q)}^{a,b} \in [0,\infty)$" to -- $L_{(p,q)}^{a,b} \in (-\infty,0]$ and $H_{(p,q)}^{a,b} \in [0,\infty)$ --.